United States Patent
Mandal et al.

(10) Patent No.: US 10,728,022 B2
(45) Date of Patent: Jul. 28, 2020

(54) SECURE HASH OPERATIONS IN A TRUSTED EXECUTION ENVIRONMENT

(71) Applicant: FUJITSU LIMITED, Kawasaki-shi, Kanagawa (JP)

(72) Inventors: Avradip Mandal, Sunnyvale, CA (US); Arnab Roy, Santa Clara, CA (US); Hart Montgomery, Redwood City, CA (US); John C. Mitchell, Stanford, CA (US)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 15/857,276

(22) Filed: Dec. 28, 2017

(65) Prior Publication Data
US 2019/0207752 A1    Jul. 4, 2019

(51) Int. Cl.
*H04L 9/06* (2006.01)
*H04L 9/32* (2006.01)
*H04L 9/00* (2006.01)
*H04L 9/08* (2006.01)

(52) U.S. Cl.
CPC .......... *H04L 9/0643* (2013.01); *H04L 9/002* (2013.01); *H04L 9/088* (2013.01); *H04L 9/3234* (2013.01); *H04L 9/3242* (2013.01)

(58) Field of Classification Search
CPC .............................. H04L 9/0643; H04L 9/088
See application file for complete search history.

(56) References Cited

U.S. PATENT DOCUMENTS

| | | | |
|---|---|---|---|
| 9,584,517 B1* | 2/2017 | Roth | H04L 63/10 |
| 2003/0039357 A1* | 2/2003 | Alten | G06F 7/582 |
| | | | 380/46 |
| 2008/0184276 A1* | 7/2008 | Jong | H04L 63/0428 |
| | | | 719/321 |
| 2009/0052675 A1* | 2/2009 | Levow | G06F 21/33 |
| | | | 380/278 |

(Continued)

OTHER PUBLICATIONS

Xu, Yuanzhong, Weidong Cui, and Marcus Peinado. "Controlled-channel attacks: Deterministic side channels for untrusted operating systems." Security and Privacy (SP), 2015 IEEE Symposium on. IEEE, 2015.

(Continued)

*Primary Examiner* — Techane Gergiso
(74) *Attorney, Agent, or Firm* — Maschoff Brennan

(57) ABSTRACT

A method of secure hash table implementation includes performing a secret key exchange between a server enclave of a server device and a client enclave of a client device and establishing an encrypted channel between the server enclave and the client enclave using the exchanged secret keys. The method includes generating a random key for a keyed hash function or a pseudo random function (PRF) and communicating the random key to the client enclave. The method includes receiving hashes of input data at the server enclave. The method includes building a hash table based on key-value pairs included in the received hashes. The method includes receiving a hash table query that includes keys. The method includes retrieving values that correspond to the keys. The method includes returning the retrieved values that correspond to the keys or a null if a value has not been inserted into the hash table for one of the keys.

20 Claims, 6 Drawing Sheets

(56) References Cited

U.S. PATENT DOCUMENTS

| | | | | |
|---|---|---|---|---|
| 2010/0306294 | A1* | 12/2010 | Schneider | H04L 9/0643 708/250 |
| 2013/0042108 | A1 | 2/2013 | Cancedda | |
| 2014/0172830 | A1* | 6/2014 | Yoshino | G06F 21/6227 707/722 |
| 2015/0304736 | A1* | 10/2015 | Lal | G06F 21/10 380/210 |
| 2017/0372076 | A1* | 12/2017 | Poornachandran | G06F 21/74 |
| 2018/0114012 | A1* | 4/2018 | Sood | G06F 21/53 |
| 2018/0167203 | A1* | 6/2018 | Belenko | H04L 9/0822 |
| 2018/0241572 | A1* | 8/2018 | Miele | H04L 63/08 |
| 2018/0248686 | A1* | 8/2018 | Alakuijala | H04L 9/0643 |

OTHER PUBLICATIONS

Lee, Sangho, et al. "Inferring fine-grained control flow inside SGX enclaves with branch shadowing." arXiv preprint arXiv:1611.06952 (2016).

Weichbrodt, Nico, et al. "AsyncShock: Exploiting synchronisation bugs in Intel SGX enclaves." European Symposium on Research in Computer Security. Springer International Publishing, 2016.

Ohrimenko, Olga, et al. "Oblivious multi-party machine learning on trusted processors." USENIX Security. vol. 16. 2016.

Celis, Pedro, Per-Ake Larson, and J. Ian Munro. "Robin hood hashing." Foundations of Computer Science, 1985., 26th Annual Symposium on. IEEE, 1985.

Goldreich, Oded. "Towards a theory of software protection and simulation by oblivious RAMs." Proceedings of the nineteenth annual ACM symposium on Theory of computing. ACM, 1987.

Mihir Belare and Phillip Rogaway. "Introduction to Modern Cryptography." Chapter 3, "Pseudorandom Functions," 2005.

EP Search Report in application No. 18211781.2 dated Apr. 23, 2019.

Costa et al., "The Pyramid Scheme: Oblivious RAM for Trusted Processors", Dec. 21, 2017.

Brasser et al., "Software Grand Exposure: SGX Cache Attacks Are Practical", Feb. 24, 2017.

Krawiecka, Klaudia, Improving Web Security Using Trusted Hardware, Jun. 30, 2017.

* cited by examiner

SECURE HASH OPERATIONS IN A TRUSTED EXECUTION ENVIRONMENT

FIELD

The embodiments discussed herein are related to secure hash operations in a trusted execution environment.

BACKGROUND

Hash tables, which may also be referred to as hash maps, are one of the most used data structures with numerous applications. The hash tables are an associative array in which values are mapped to keys based on a hash function. The hash function computes an index in an array where the value may be found. There are several hash functions that dictate how the values are related to the key and indices.

The subject matter claimed herein is not limited to embodiments that solve any disadvantages or that operate only in environments such as those described. Rather, this background is only provided to illustrate one example technology area where some embodiments described herein may be practiced.

SUMMARY

According to an embodiment, a method of secure hash table implementation may include performing a secret key exchange between a server enclave of a server device and a client enclave of a client device. The method may include establishing an encrypted channel between the server enclave and the client enclave using the exchanged secret keys. The method may include generating a random key for a keyed hash function or a pseudo random function (PRF). The method may include communicating the random key to the client enclave of the client device via the encrypted channel. The method may include receiving from the client enclave, hashes of input data at the server enclave via the encrypted channel. The method may include building a hash table based on multiple key-value pairs included in the received hashes. The method may include receiving a hash table query from the client device. The hash table query may include multiple keys. The method may include retrieving values that correspond to the keys responsive to the hash table query. The method may include returning the retrieved values that correspond to the keys or a null if a value has not been inserted into the hash table for one of the keys included in the hash table query.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Insecure hash tables may support an update operation and a find operation. The update operation may be represented by the operations: Update(Key, Value): Assigns HashTable[Key]:=Value. The find operation may be represented by the operation Find(Key)→Value or Null: Returns HashTable[Key] or Null if Update(Key, *) has not previously been called. In the insecure hash tables, the hash table key are related to field information, which may result in vulnerabilities of the insecure hash tables. Additionally, insecure hash table implementations are susceptible to cache access pattern based attacks. Accordingly, embodiments described in the present disclosure relate to secure hash tables and hash operations, which may be implemented in a trusted execution environment.

Additionally, embodiments described in the present disclosure relate to computing systems configured for execution of computer operations in the trusted execution environment. The secure hash operations described in the current disclosure provide a technical solution to the current inefficiencies in data storage and retrieval in trusted execution environments. Additionally, the secure hash operations described herein provide an improvement in security of data stored in computing arrays. In particular, some embodiments provide, among other benefits, an efficient guard against controlled-channel attacks and/or cache fault attacks that may launched by adversarial entities in trusted execution environments. Use of the hash table operations described in the present disclosure may reduce such vulnerabilities without significantly increasing processing overhead.

These and other embodiments are described with reference to the appended Figures in which like item number indicates like function and/or structure unless described otherwise.

Figure 1:
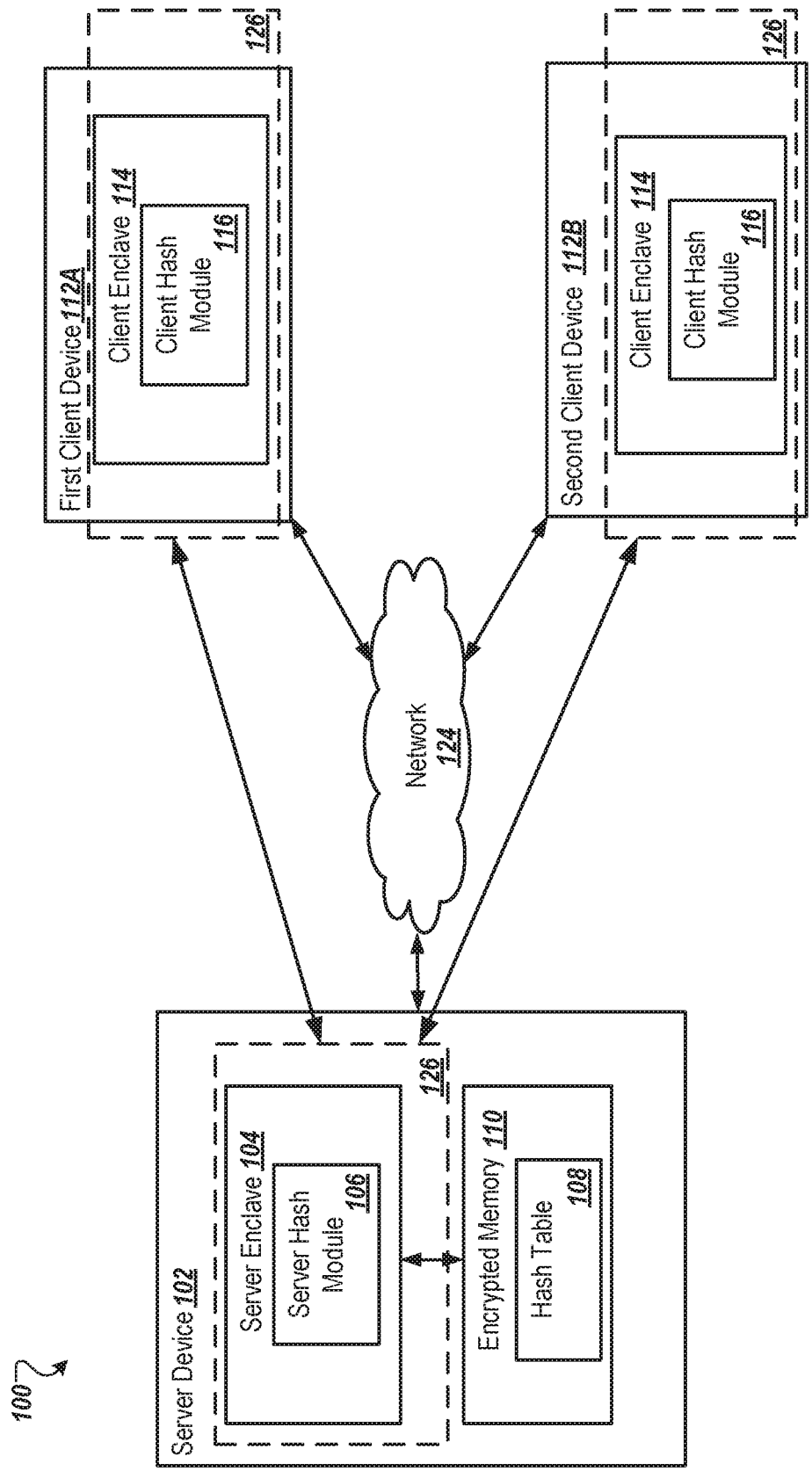
FIG. 1 is a block diagram of an example secure hash environment in which some embodiments described in the present disclosure may be implemented.

FIG. 1 is a block diagram of an example secure hash environment 100 in which some embodiments described in the present disclosure may be implemented. The secure hash environment 100 may include a trusted execution environment 126. The trusted execution environment 126 may include a server enclave 104 of a server device 102 and client enclaves 114 of client devices 112A and 112B.

The trusted execution environment 126 may include software guard extensions (SGX) in some embodiments. The SGX may be implemented or provided by INTEL®. In other embodiments, another suitable trusted execution environment technology may be implemented in the secure hash environment 100. Generally, the trusted execution environment 126 may provide a strong security guarantee in the secure hash environment 100. For instance, the secure hash environment 100 may be characterized as a cloud network because the client devices 112A and 112B are connected to the server device 102 by a network 124. The trusted execution environment 126 may provide the strong security guarantee in the cloud network that includes a complete confidentiality of client data communicated in the secure hash environment 100. The security guarantee provided by the trusted execution environment may be provided even as computations are performed on the client data that is stored on the server enclave 104 of the server device 102.

In some existing trusted execution environments, the security guarantee may be vulnerable to adversaries that infer a secret associated with the client data based on memory access patterns. For instance, cache fault attacks may compromise secret keys stored in the server device 102. Some details of the cache fault attacks and trusted execution environments are provided in Xu, Yuanzhong, Weidong Cui, and Marcus Peinado. "Controlled-channel attacks: Deterministic side channels for untrusted operating systems." Security and Privacy (SP), 2015 IEEE Symposium on. IEEE, 2015 and Lee, Sangho, et al. "Inferring fine-grained control flow inside SGX enclaves with branch shadowing." arXiv preprint arXiv: 1611.06952 (2016), which are incorporated herein by reference in their entireties.

Some existing trusted execution environments may implement an oblivious random access memory (ORAMs) to attempt to mitigate against such vulnerabilities. ORAMS may provide some protection against the cached fault attacks. However, the ORAMS are inefficient. For instance, implementation of ORAMs may include relatively long time periods in which the read and write operations occur. Additionally, ORAMS require relatively large amounts of memory. Accordingly, implementation of ORAMS may not be practical in some applications. Some additional details of ORAMs may be found in Goldreich, Oded. "Towards a theory of software protection and simulation by oblivious RAMs." *Proceedings of the nineteenth annual ACM symposium on Theory of computing.* ACM, 1987, which is incorporated herein by reference in its entirety.

Accordingly, the secure hash environment 100 may be configured to implement a secure hash algorithm between the server enclave 104 and the client enclaves 114. The secure hash algorithm may provide a data storage structure and organization technique that overcomes some of the disadvantages of the ORAM while mitigating the vulnerabilities described above. For example, the secure hash environment 100 may help protect against adversarial cache fault attacks and other attacks that attempt to infer a secret stored in the secure hash environment 100 based on memory access patterns.

The secure hash environment 100 may include the client devices 112A and 112B (generally, client device 112 or client devices 112) that are communicatively coupled to the server device 102 via the network 124. Data and information may be communicated between the client devices 112 and the server device 102 via the network 124. The client devices 112, the network 124, and the server device 102 are described below.

The network 124 may include any communication network configured for communication of signals between any of the client devices 112 and the server device 102 of the secure hash environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols. In some embodiments, the network 124 includes or is configured to include a BLUETOOTH® communication network, a Wi-Fi communication network, a ZigBee communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, or any other protocol that may be implemented with the client devices 112 and the server device 102.

The client devices 112 and the server device 102 may include any computer-based or hardware-based computing system. The client devices 112 and the server device 102 may be configured to communicate with one another via the network 124 in the secure hash environment 100. The client devices 112 may be associated with or operated by a user or set of users. The users associated with the client devices 112 may be strangers or may be generally dis-associated from one another.

The client devices 112 may include the client enclave 114 and the server device 102 may include the server enclave 104. The client enclave 114 and the server enclave 104 are protected areas of execution in the memory (e.g., memory 412 of FIG. 4) of the client devices 112 and the server device 102, respectively. Special instructions may be implemented to store application code in the client enclave 114 and the server enclave 104. For example, in embodiments implementing the Intel® SGX, one or more software development kits (SDK) or application programming interfaces (APIs) may be provided that enable the storage and implementation of application code in the client enclave 114 and the server enclave 104.

Generally, the client devices 112 may be configured to communicate data and information to the server device 102. The server device 102 may be configured to receive the data from the client devices 112 and may be configured to perform some operations on the received data. For example, the server device 102 may be configured to implement a genome-wide association study (GWAS). In these embodiments, the client devices 112 may communicate genetic records of users or data representative thereof to the server device 102. The server device 102 may then process the DNA to identify genes that may be associated with a disease. In another embodiment, the server device 102 may be configured to implement a survey, a poll, or a census. In these and other embodiments, the client devices 112 may be configured to communicate individual responses to the server device 102. The server device 102 may process the responses to generate a poll result, a census statistic, or a survey result.

In some embodiments of the secure hash environment 100, the data communicated via the network 124 may be sensitive. For instance, the genetic records and/or the individual responses may be considered private. Accordingly, the server device 102 may be configured to receive, organize, and process the received data in a way in which privacy and security of the received data is maintained. For example, the server device 102 may include a server hash module 106 and the client devices 112 may include a client hash module 116 which may be configured to implement the secure hash operations, which may maintain privacy and security of the received data.

The server hash module 106, the client hash module 116, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the server hash module 106 and the client hash module 116 may be implemented using a combination of hardware and software. Implementation in software may include rapid activation and deactivation of one or more transistors or transistor elements such as may be included in hardware of a computing system (e.g., the server device 102 or the client device 112). Additionally, software defined instructions may operate on information within transistor elements. Implementation of software instructions may at least temporarily reconfigure electronic pathways and transform computing hardware.

The secure hash operations may be configured to generate a hash table 108 in which hashes of input data may be organized and stored. The hash table 108 may be memory oblivious. The hashes may be subsequently retrieved and accessed in the secure hash environment 100. In the embodiment of FIG. 1, the secure hash environment 100 includes the hash table 108. In other embodiments, the secure hash environment 100 may include an associative array, a dictionary, or another suitable data structure.

For example, in some embodiments, the server hash module 106 of the server device 102 may be configured to perform one or more setup processes for the secure hash operations. The setup processes may include a secret key exchange between the server enclave 104 of the server device 102 and the client hash module 116 of the client device 112. The exchanged secret keys in the secure hash environment 100 may include asymmetric keys (e.g., private and public key pair(s)) and/or symmetric key(s).

The server hash module 106 and/or the client hash module 116 may be configured to establish an encrypted channel between the server enclave 104 and the client enclave 114. For example, the data and information communicated between the server enclave 106 and the client enclave 114 may be encrypted using the exchanged secret keys. Accordingly, most or all of the data and information on the encrypted channel may be ciphertext that may be subsequently decrypted, stored, processed, etc.

The server hash module 106 may generate a random key for a keyed hash function of a pseudorandom function (PRF). The keyed hash function may be based on a secure hash algorithm (SHA) that includes SHA-1, SHA-2, or SHA-3. In some embodiments, the generation of the random key may include sampling a PRF. In general, the PRF may include one or more functions of the pseudorandom family of functions. Some additional details of the pseudorandom function may be found in Mihir Belare and Phillip Rogaway. "Introduction to Modern Cryptography." Chapter 3, "*Pseudorandom Functions,*" 2005, which is incorporated herein by reference in its entirety.

The server hash module 106 may then communicate the random key to the client enclaves 114 of the client devices 112 via the encrypted channel. The client devices 112 may receive the random key. In some embodiments, the generation of the random key may only be performed once. The random key may accordingly be stored at the client device 112 and the server device 102 and used throughout interaction therebetween.

The client device 112 may also receive or generate input data. The input data may include any data or information that is communicated to or related to data that is communicated the server device 102. For instance, as discussed above, the input data may include genetic records or the response data. The client hash module 116 may hash the input data. For example, the client hash module 116 may implement a hash function to generate keys that are related to the input data. In some embodiments, the hash module 116 may use any non-cryptographic hash function to hash the input data. Some examples of the non-cryptographic hash function may include MurmurHash, DJB2, and the like. The client hash module 116 may then communicate hashes of the input data to the server enclave 104. The hashes may be communicated via the encrypted channel.

The server enclave 104 may receive the hashes from the client enclaves 114. Based on key-value pairs included in the received hashes, the server enclave 104 may build the hash table 108. In some embodiments the hashes may include the input data. In other embodiment, the input data may not be communicated to the server enclave 104.

In the depicted embodiment, the hash table 108 may be built and/or stored in an encrypted memory 110. The encrypted memory 110 may provide an additional level of security. In other embodiments, the hash table 108 may be included in another memory, which may not be encrypted.

For example, the hash table 108 may be configured to store social security numbers and names (e.g., (SSN, Name)) as key value pairs. The hash table 108 may be configured to only support a setwise update. Accordingly, the server device 102 may receive ((SSN_1, Name_1), . . . , (SSN_10, Name_10)) from one of the client devices 112. The hash table 108 may internally use any regular insecure hash table implementation. The regular insecure hash table implementation may support single element update operations. By using the random permutations during assignment operations, the key value pairs may be inserted in the hash table 108 in a random order. Use of the PRF, an insecure hash table key is independent of the sensitive SSN field.

Following building of the hash table 108, the client devices 112 may generate a hash table query. The client hash module 116 may communicate the hash table query to the server enclave 104. Responsive to the hash table query, the server hash module 106 may retrieve values that correspond to keys included in the hash table query. The server hash module 106 may return the retrieved values that correspond to the keys or a null if a corresponding key has not been inserted into the hash table 108.

In some embodiments, query collisions may be leaked by the server device 102. However, the rest of the hashes are not available and are not leaked. As used in the present disclosure, "leaked" indicates that the query collisions are vulnerable to being revealed to an unauthorized entity following a particular set or series of interactions between the server device 102 and the client devices 112. Thus, the distribution of the query collisions even when accessed by unauthorized entities may not reveal much if any information about the input data. For example, in response to the clients 112 making the same hash table query multiple times, an adversarial server or another unauthorized entity may be able to deduce a distribution of query patterns. However, the adversarial server may not be able to deduce actual content of the queries.

Additionally, the hashes communicated to the server device 102 by a first client device 112A and a second client device 112B may result in different positions in the hash table 108. In these and other circumstances, the server hash module 106 may be configured to merge the hashes into the hash table 108. In some embodiments, the merging may be an addition operation. For example, when values include a same random key, the hashes may be merged using an addition operation.

Modifications, additions, or omissions may be made to the secure hash environment 100 without departing from the scope of the present disclosure. For example, the secure hash environment 100 may include one or more server devices 102, one or more client devices 112, one or more networks 124, or any combination thereof. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
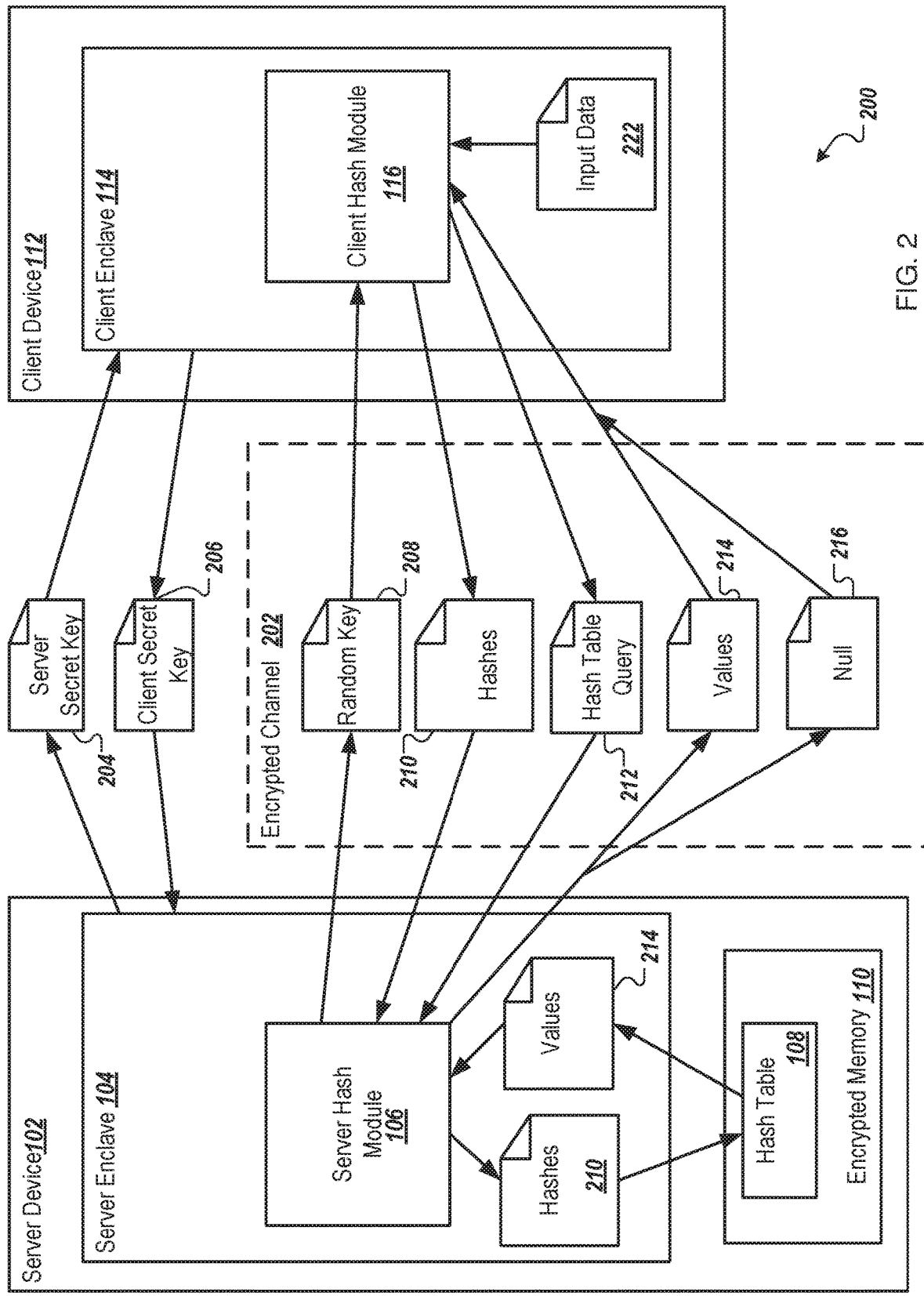
FIG. 2 illustrates an example secure hashing process that may be implemented in the secure hash environment of FIG. 1.

FIG. 2 illustrates an example secure hash process 200 that may be implemented in the secure hash environment 100 of FIG. 1 or similar operating environments. FIG. 2 includes the server device 102, the server enclave 104, the hash table 108, the server hash module 106, the encrypted memory 110, the client device 112, the client enclave 114, and the client hash module 116 described with reference to FIG. 1. In FIG. 2, a network (e.g., network 124 of FIG. 1) is not depicted. Nevertheless, communication between the server device 102 and the client device 112 may be via a communication network such as network 124.

In the process 200, a secret key exchange may occur between server enclave 104 of the server device 102 and the client enclave 114 of the client device 112. For example, the server device 102 may communicate a server secret key 204 to the client device 112 and the client device 112 may communicate a client secret key 206 to the server enclave 104. The server secret key 204 and the client secret key 206 may be formatted according to any suitable public key infrastructure (e.g., SPKI, X.509-based certificates, etc.).

Using the exchanged secret keys 204 and 206, an encrypted channel 202 may be established between the server enclave 104 and the client enclave 114. The encrypted channel 202 may be established by the server device 102 and/or the client device 112 in a communication network.

The server hash module 106 may generate a random key 208. The random key 208 may be generated by the server hash module 106 during an initialization or setup operation. The random key 208 may be generated by sampling a PRF. The random key 208 may be communicated to the client enclave 114 of the client device 112 as well as any other client enclaves that communicate with the server device 102. The random key 208 may be stored in the client enclave 114, which may reduce accessibility to the random key 208. The communication of the random key 208 may be via the encrypted channel 202. In some embodiments, the generation of the random key 208 may occur only once. For instance, the random key 208 may be used throughout interactions between the client device 112 and the server device 102.

The client hash module 116 may generate hashes 210. The hashes 210 may then be communicated to the server hash module 106 via the encrypted channel 202. The hashes 210 may include a set of key-value pairs. The key-value pairs may be represented by an example (key, value) pairs:

$\{(k_1, v_1), \ldots, (k_n, v_n)\}$.

In the (key, value) pairs, $k_1 \ldots k_n$ represent keys. The parameters $v_1 \ldots v_n$ represent values. The parameter n represents a maximum index variable for the keys and values in the (key, value) pairs. The hashes 210 may be keys and values of input data 222.

The server hash module 106 may be configured to assign the received hashes 210 to the hash table 108. In some embodiments, the server hash module 106 may assign the received hashes 210 according to example assignment expressions:

Sample a PRP key rk; and

For $i \in [1,n]$:

HT.Update($PRF_{sk}(k_{\pi_{rk}(i)}), v_{\pi_{rk}(i)}$).

In the assignment expressions, n represents the maximum index variable. HT Update represents an assignment function that outputs an assignment to the hash table 108. HT Update is a setwise update operation. The parameter sk represent the random key. The function PRF represents a pseudorandom function which is seeded with the random key. The parameter PRP represents a pseudorandom permutation. Some details of pseudorandom permutation are provided in Belare & Rogaway included above. The parameter $\pi$ represents a pseudorandom permutation from [1,n] to [1,n]. Thus, $\pi$ permutes the first n natural numbers. The parameter rk represents a pseudorandom permutation key sampled from the PRP.

According to the assignment expression, when i is equal to 1, the assignment expressions reduce to HT.Update($PRF_{sk}(k_{\pi_{rk}(1)}), v_{\pi_{rk}(1)}$). The value of $\pi_{rk}(1)$ may be equal to a particular value, represented by Y (depending on the PRP, $\pi$, and rk). Thus, the assignment expression may reduce to HT.Update($PRF_{sk}(k_Y), v_Y$). The values $k_Y$ and $v_Y$ may correspond to one of the key-value pairs of the received hashes 210. The $PRF_{sk}$ receives as input $k_Y$. Execution of the $PRF_{sk}(k_Y)$ may be equal to another number, represented by X (again depending on the PRF and the sk). The assignment expression further reduces to HT.Update(X, $v_Y$). The assignment function then receives as input (X, $v_Y$), which returns an assignment that corresponds to an index in the hash table 108. A similar set of operations are performed for each value of i.

Following the building of the hash table 108, the server hash module 106 may receive a hash table query 212. The hash table query 212 may be generated at the client hash module 116 and may be communicated via the encrypted channel 202. The hash table query 212 may include a set of keys, which may be represented by an example key set:

$(k_1, \ldots, k_m)$.

In the key set, $k_1 \ldots k_n$ represent keys. The parameter m represents the maximum index variable for the keys in the key set.

The server hash module 106 may receive the hash table query 212. Responsive to the hash table query 212, the server hash module 106 may retrieve values 214 that correspond to the keys in the hash table query 212. In some embodiments, the server hash module 106 may retrieve the values 214 according to example retrieval expressions:

Sample a PRP key rk; and

For $i \in [1,m]$:

$v_{\pi_{rk}(i)}$=HT.Find($PRF_{sk}(k_{\pi_{rk}(i)})$).

In the retrieval expressions, HT.Find represents a retrieve function for the hash table 108. HT.Find may include a setwise find operation. The parameter $\pi$ represents a pseudorandom permutation from [1,m] to [1,m]. Thus, $\pi$ permutes the first m natural numbers. The other parameters are as described above. Execution of the retrieval expressions, an inverse set of operations occurs to those described above with reference to the assignment expressions. For instance, when i is equal to 1, $k_{\pi_{rk}(i)}$ may be equal to $k_Y$. Additionally, $v_{\pi_{rk}(i)}$ may be equal to $v_Y$. The parameters $k_Y$, $v_Y$ may correspond to one of the hashes 210 described above. The value $k_Y$ may be input to the $PRE_{sk}$ which may be equal to X. Accordingly, the retrieval expressions may reduce to $v_Y$=HT.Find($PRF_{sk}(k_Y)$) then $v_Y$=HT.Find(X). Similar operations may be performed for each value of i. The retrieval expressions return a null 216 if there is no value for the keys in the value 214.

The server hash module 106 may then return the retrieved values 214 that correspond to the keys or the null 216. The retrieved values 214 and/or the null 216 may be communicated to the client hash module 116 via the encrypted channel 202.

Figure 3:
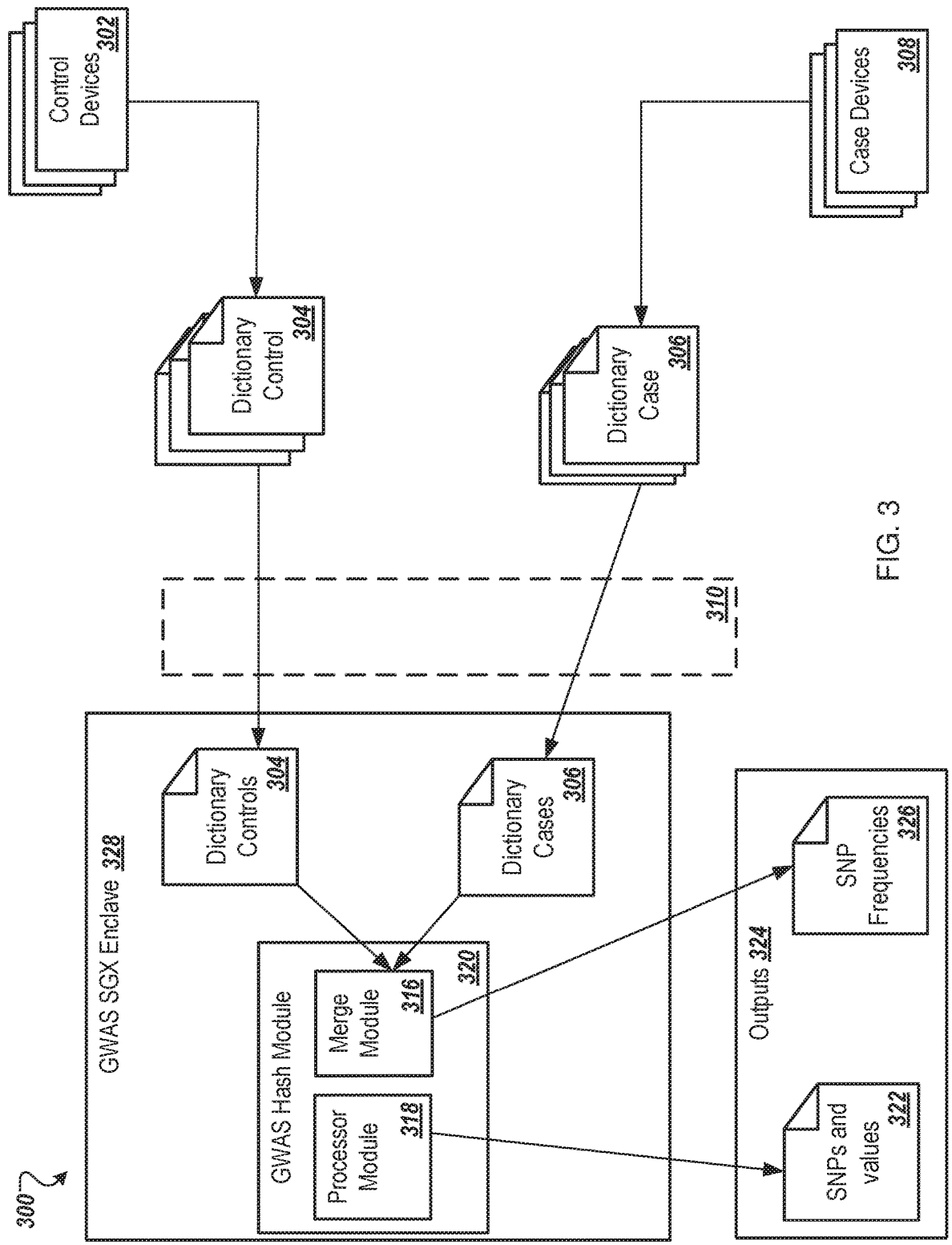
FIG. 3 is a block diagram of an example GWAS environment that is an example embodiment of the secure hash environment of FIG. 1.

FIG. 3 is a block diagram of an example GWAS environment 300 that is an example embodiment of the secure hash environment 100 of FIG. 1. The GWAS may be configured to compute frequency statistics of genomic records from several individuals who may be associated with control devices 302 or with case devices 308. The devices 302 and 308 may be substantially similar to and/or correspond to the client devices 112. The genomic records may be keyed by single nucleotide polymorphisms (SNP) identifiers. The SNP identifier may be several bits long.

In conventional GWAS environments, it may be impractical to create an array implementation where the index is the SNP identifier itself. Accordingly, the GWAS environment 300 may provide the secure hash processes described in the present disclosure to efficiently implement a privacy-preserving merging of individual records at a GWAS SGX enclave 328. The GWAS SGX enclave 328 may then output SNP frequencies 325 and a set of SNPs 322. In general, only the output SNP frequencies 325 may be visible to a cloud, while individual genomic records may be kept private.

In the GWAS environment 300, the control devices 302 may communicate dictionary controls 304. The dictionary controls 304 may include hashes or key-value pairs similar to the hashes 210 described above. The dictionary controls 304 may be communicated to the GWAS SGX enclave 328 via an encrypted channel 310, which may be established as described above. The dictionary controls 304 may include genomic records of the patients associated with the control devices 302. The dictionary controls 304 may be represented as control expressions:

$$dictcont[snp_1] = a'_1$$
$$\ldots$$
$$dictcont[snp_l] = a'_l.$$

The control expressions include dictionary or set of key-value pairs. The parameter $snp_1$ represents an SNP for a first control patient. The parameter $snp_l$ represents an SNP for an lth control patient.

Similarly, in the GWAS environment 300, the case devices 308 may communicate dictionary cases 306. The dictionary cases 306 may include hashes or key-value pairs similar to the hashes 210 described above. The dictionary cases 306 may be communicated to the GWAS SGX enclave 328 via an encrypted channel 310. The dictionary cases 306 may include genomic records of the patients associated with the case devices 308. The dictionary cases 306 may be represented as case expressions:

$$dictcase[snp_1] = a_1$$
$$\ldots$$
$$dictcase[snp_l] = a_l$$

The case expressions include dictionary or set of key-value pairs. The parameter $snp_1$ represents an SNP for a first case patient. The parameter $snp_l$ represents an SNP for an lth case patient.

The dictionary controls 304 and the dictionary cases 306 may be received at the GWAS SGX enclave 328. The GWAS SGX enclave 328 may include a GWAS hash module 320 that may include a merge module 316 and an analytics module 318. The analytics module 318 may be configured to process the dictionary controls 304 and the dictionary cases 312. For instance, the analytics module 318 may perform a chi-squared operation according to example chi-squared expressions:

For all $i \in [1, \ell]$

Perform $\chi^2$ test between $[a_i, a'_i, 2n_1 - a_i, 2n_2 - a'_i]$; and $\left[\dfrac{a_i + a'_i}{2}, \dfrac{a_i + a'_i}{2}, n_1 + n_2 - \dfrac{a_i + a'_i}{2}, n_1 + n_2 - \dfrac{a_i + a'_i}{2}\right].$ In the chi-squared expressions, the parameters $a_i$ and $a'_i$, are as described above. The parameter $n_1$ represents a total number of users in a case group in a genome wide association study (GWAS). The parameter $n_2$ represents a total number of users in control group in the GWAS.

The analytics module 318 may be configured to output particular SNPs 322 and one or more values related to the particular SNPs. For example, based on the chi-squared operation, the SNPs with the least p-values along with the p-values may be included in the SNPs 322 output by the analytics module 318.

The merge module 316 may be configured to merge the dictionary controls 304 and the dictionary cases 306. The merge operation may include an addition operation, which may be represented by an addition expression:

(dict$A$∪dict$B$)[$x$]=dict$A$[$x$]+dict$B$[$x$].

The addition expression is a generalized expression. In the addition expression dictA may represent the case expressions or the dictionary cases 306. The parameter dictB may represent the dictionary control 304. The parameter x represents a dictionary key, which may include SNP strings in the GWAS.

The merge module 316 may be further configured to output SNP frequencies 326. In some embodiments, the SNP frequencies 326 may be represented by frequency expressions:

$$\left(snp_1, \dfrac{a_1 + a'_1}{2(n_1 + n_2)}\right)$$
$$\ldots$$
$$\left(snp_\ell, \dfrac{a_\ell + a'_\ell}{2(n_1 + n_2)}\right)$$

In the frequency expressions, the $a_i$, $a'_i$, $n_1$, and $n_2$ are as described above.

The embodiments of the secure hash environment 100 are not limited to the GWAS environment 300 of FIG. 3. The secure hash environment 100 may be embodied in any suitable environment with a trusted execution environment.

Figure 4:
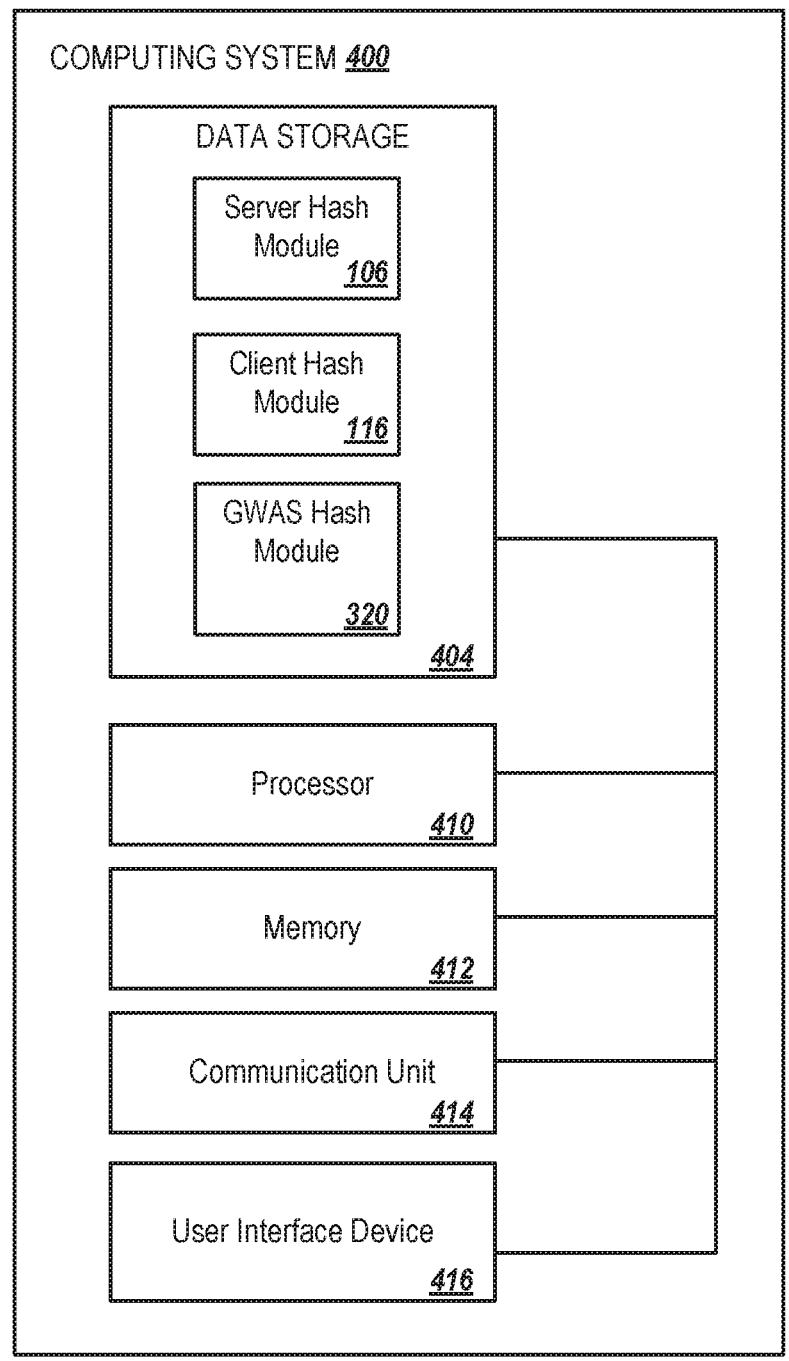
FIG. 4 is a block diagram of an example computing system that is configured for secure hash table implementations.

FIG. 4 illustrates an example computing system 400 configured for secure hash operations in a trusted execution environment according to at least one embodiment of the present disclosure. The computing system 400 may be implemented in the secure hash environment 100 of FIG. 1, for instance. Examples of the computing system 400 may include one or both of the server device 102 and the client device 112. The computing system 400 may include one or more processors 410, a memory 412, a communication unit 414, a user interface device 416, and a data storage 404 that includes the server hash module 106, the client hash module 116, and the GWAS hash module 320 (collectively, modules 116/106/320).

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computing system 400 and to present the communication to the processor 410 or to send a communication from the processor 410 to another device or network (e.g., 124 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The modules 116/106/320 may include program instructions stored in the data storage 404. The processor 410 may be configured to load the modules 116/106/320 into the memory 412 and execute the modules 116/106/320. Alternatively, the processor 410 may execute the modules 116/106/320 line-by-line from the data storage 404 without loading them into the memory 412. When executing the modules 116/106/320, the processor 410 may be configured to perform a secure hash or hash table process as described elsewhere in this disclosure.

Modifications, additions, or omissions may be made to the computing system 400 without departing from the scope of the present disclosure. For example, in some embodiments, the computing system 400 may not include the user interface device 416. In some embodiments, the different components of the computing system 400 may be physically separate and may be communicatively coupled via any suitable mechanism. For example, the data storage 404 may be part of a storage device that is separate from a server, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5A:
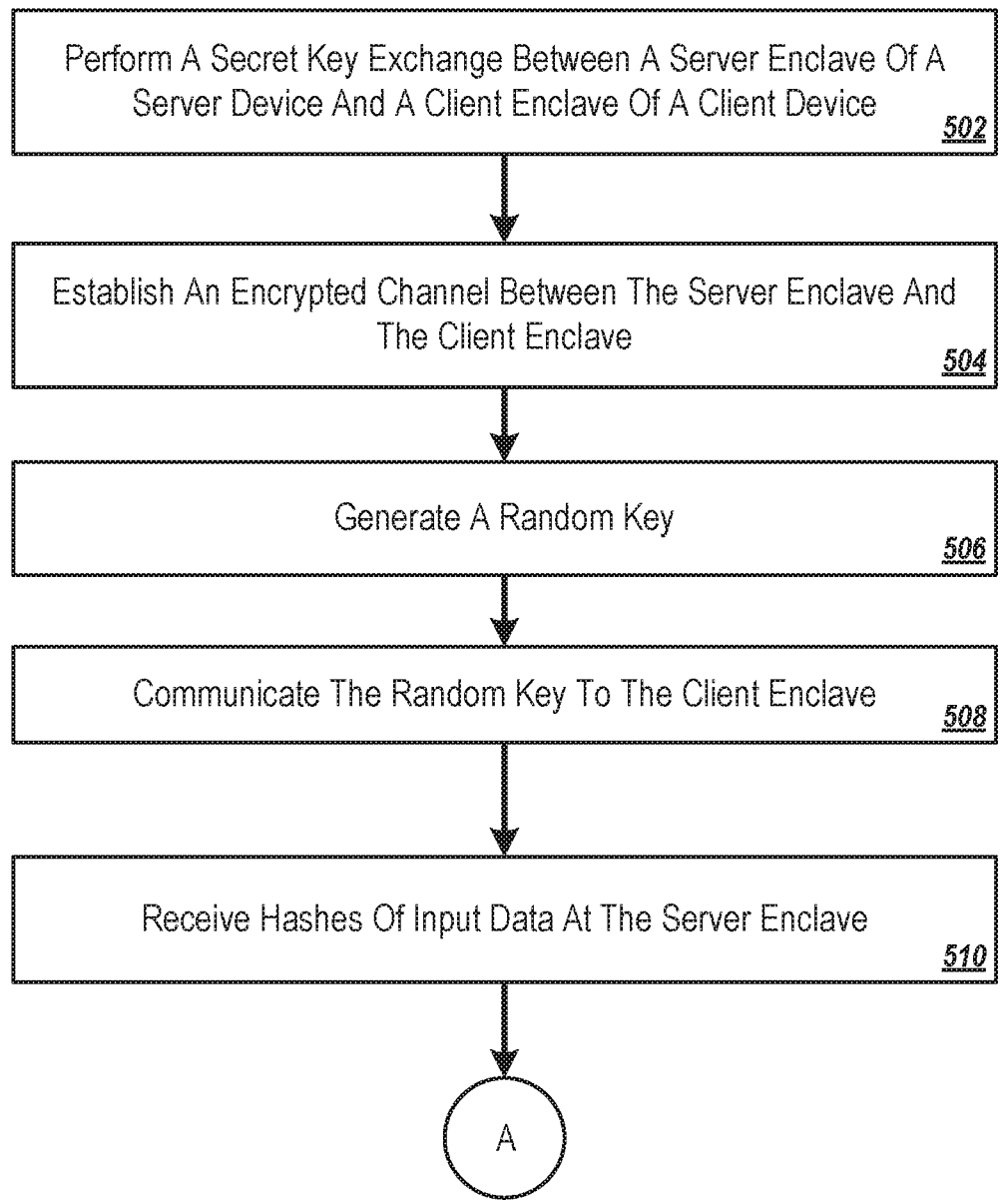
FIGS. 5A and 5B are a flow diagram of an example method of secure hash table implementation, all according to at least one embodiment described in the present disclosure.
Figure 5B:
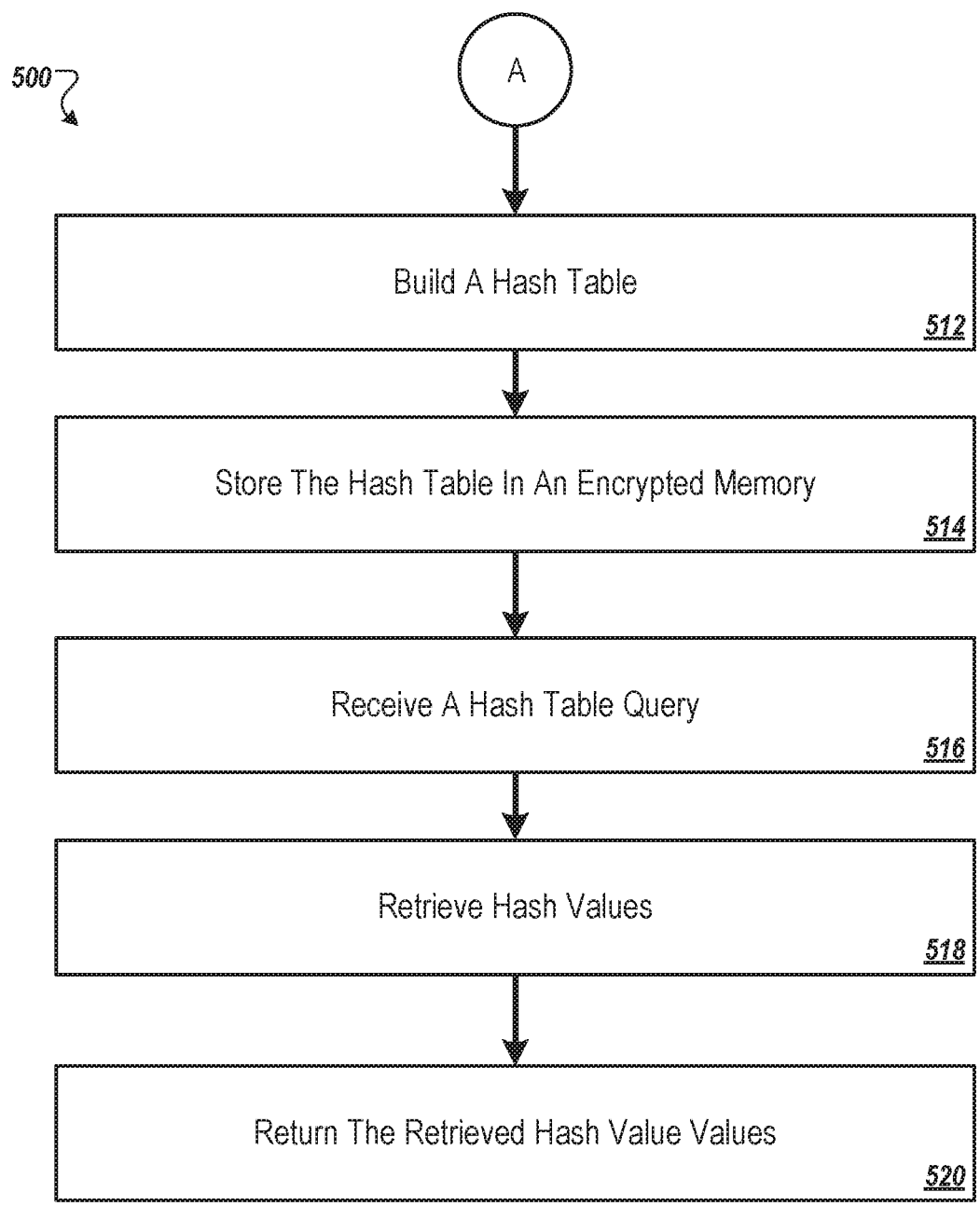

FIGS. 5A and 5B are a flow chart of an example method 500 of secure hash implementation according to at least one embodiment described in the present disclosure. Although illustrated as discrete blocks, various blocks in FIGS. 5A and 5B may be divided into additional blocks, combined into fewer blocks, or eliminated, depending on the desired implementation.

The method 500 may be performed in an operating environment such as secure hash environment 100 of FIG. 1 or the GWAS environment 300. The method 500 may be programmably performed in some embodiments by the server device 102 or the client device 112 described with reference to FIGS. 1 and 2. In some embodiments, the server device 102, the client device 112, or another computing system may include or may be communicatively coupled to a non-transitory computer-readable medium (e.g., the memory 412 of FIG. 4) having stored thereon programming code or instructions that are executable by one or more processors (such as the processor 410 of FIG. 4) to cause a computing system, the server device 102, or the client device 112 to perform or control performance of the method 500. Additionally or alternatively, the service device 102 or the client device 112 may include the processor 410 described elsewhere in this disclosure that is configured to execute computer instructions to cause the service device 102, the client device 112, or another computing system to perform or control performance of the method 500.

With reference to FIG. 5A, the method 500 may begin at block 502 in which a secret key exchange may be performed. The secret key exchange may be performed between a server enclave of a server device and a client enclave of a client device. The server enclave and the client enclave may be implemented as part of a trusted execution environment. In some embodiments, the trusted execution environment may include SGX. At block 504, an encrypted channel may be established. The encrypted channel may be established between the server enclave and the client enclave. The encrypted channel may be established using the exchanged secret keys.

At block 506, a random key may be generated. The random key may be generated for a keyed hash function or a PRF. Generation of the random key may include sampling a PRF. In some embodiments, the generating of the random key may occur only once. The keyed hash function may be based on a secure hash algorithm (SHA) that may include SHA-1, SHA-2, or SHA-3. At block 508, the random key may be communicated to one or more client devices. The random key may be communicated to the client enclave of the client device via the encrypted channel.

At block 510, hashes of input data may be received. The hashes may be received from the client enclave. The hashes may be received at the server enclave via the encrypted channel. The hashes may include multiple key-value pairs. The key-value pairs may be represented by a (key, value) pairs $\{(k_1,v_1), \ldots, (k_n,v_n)\}$, in which $k_1 \ldots k_n$ represent keys, $v_1 \ldots v_n$ represent values, and n is the maximum index variable for the keys and the values.

Referring to FIG. 5B, at block 512, a hash table may be built. The hash table may be built. The hash table may be based on key-value pairs included in the received hashes. To build the hash table, assignments may be applied to the hashes. The hashes may be assigned according to example assignment expressions. In some embodiments, the assignment expressions are described above. At block 514, the hash table may be stored in an encrypted memory.

At block 516, a hash table query may be received. The hash table query may be received from the client device. The hash table query may include multiple keys. The keys may be represented by a key set $(k_1, \ldots, k_m)$, in which $k_1 \ldots k_m$ represent keys and m is the maximum index variable for the keys. At block 518, values may be retrieved. The values may be retrieved responsive to the hash table query. In some embodiments, retrieving values may be performed according to retrieving expressions, an example of which is described above. At block 520, the retrieved values may be returned. The retrieved value may correspond to the keys or a null. The null may be returned if a value has not been inserted into the hash table for one of the keys.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, in some embodiment, the method 500 may be performed such that only a distribution of query collisions are vulnerable to being revealed to an unauthorized entity.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of secure hash table implementation, the method comprising:

performing a secret key exchange between a server enclave of a server device and a client enclave of a client device;

using the exchanged secret keys, establishing an encrypted channel between the server enclave and the client enclave;

generating a random key for a keyed hash function or a first pseudorandom function (PRF);
communicating the random key to the client enclave of the client device via the encrypted channel;
receiving from the client enclave, hashes of input data at the server enclave via the encrypted channel;
building a hash table based on a plurality of key-value pairs included in the received hashes, an order of the key-value pairs in the hash table based on a second pseudorandom function (PRF) seeded with the random key such that the order within the hash table is independent of the value of the key-value pairs;
receiving a hash table query from the client device, the hash table query including a plurality of keys;
responsive to the hash table query, retrieving values that correspond to the plurality of the keys; and
returning the retrieved values that correspond to the plurality of the keys or a null if a value has not been inserted into the hash table for one of the plurality of the keys included in the hash table query.

2. The method of claim 1, wherein the generating the random key includes sampling the first pseudorandom function.

3. The method of claim 2, wherein:
the plurality of key-value pairs are represented by a (key, value) pairs:
$\{(k_1,v_1), \ldots, (k_n,v_n)\}$, in which $k_1 \ldots k_n$ represent keys, $v_1 \ldots v_n$ represent values, and n is the maximum index variable for the keys and the values; and
the hashes of the input data are assigned according to expressions:
For $i \in [1,n]$:
HT.Update($PRF_{sk}(k_{\pi_{rk}(i)}), v_{\pi_{rk}(i)}$), in which HT.Update represents an assignment function, sk represents the random key, PRF represents the second pseudorandom function, $\pi$ represents a pseudorandom permutation from [1,n] to [1,n], and rk represents a pseudorandom permutation key.

4. The method of claim 3, wherein:
the plurality of keys is represented by a key set:
$(k_1, \ldots, k_m)$, in which $k_1 \ldots k_m$ represent keys and m is the maximum index variable for the keys; and
the retrieving values is performed according to expressions:
For $i \in [1,m]$:
$v_{\pi_{rk}}(i)$=HT.Find($PRF_{sk}(k_{\pi_{rk}(i)})$), in which HT.Find represents a retrieve function for the hash table and $\pi$ represents a pseudorandom permutation from [1,m] to [1,m].

5. The method of claim 2, wherein the generating of the random key occurs only once.

6. The method of claim 1, wherein:
the random key is generated for the keyed hash function; and
the keyed hash function is based on a secure hash algorithm (SHA) that includes SHA-1, SHA-2, or SHA-3.

7. The method of claim 1, further comprising storing the hash table in an encrypted memory.

8. The method of claim 1, wherein the server enclave and the client enclave are part of a trusted execution environment.

9. The method of claim 8, wherein the trusted execution environment includes software guard extensions (SGX).

10. The method of claim 1, wherein only a distribution of query collisions are vulnerable to being revealed to an unauthorized entity.

11. A non-transitory computer-readable medium having encoded therein programming code executable by one or more processors to perform or control performance of operations comprising:
performing a secret key exchange between a server enclave of a server device and a client enclave of a client device;
using the exchanged secret keys, establishing an encrypted channel between the server enclave and the client enclave;
generating a random key for a keyed hash function or a first pseudorandom function (PRF);
communicating the random key to the client enclave of the client device via the encrypted channel;
receiving from the client enclave, hashes of input data at the server enclave via the encrypted channel;
building a hash table based on a plurality of key-value pairs included in the received hashes, an order of the key-value pairs in the hash table based on a second pseudorandom function (PRF) seeded with the random key such that the order within the hash table is independent of the value of the key-value pairs;
receiving a hash table query from the client device, the hash table query including a plurality of keys;
responsive to the hash table query, retrieving values that correspond to the plurality of the keys; and
returning the retrieved values that correspond to the plurality of the keys or a null if a value has not been inserted into the hash table for one of the plurality of the keys included in the hash table query.

12. The non-transitory computer-readable medium of claim 11, wherein the generating the random key includes sampling the first pseudorandom function.

13. The non-transitory computer-readable medium of claim 12, wherein:
the plurality of key-value pairs are represented by a (key, value) pairs:
$\{(k_1, v_1), \ldots, (k_n, v_n)\}$ in which $k_1 \ldots k_n$ represent keys, $v_1 \ldots v_n$ represent values, and n is the maximum index variable for the keys and the values; and
the hashes of the input data are assigned according to expressions:
For $i \in [1,n]$:
HT.Update($PRF_{sk}(k_{\pi_{rk}(i)}), v_{\pi_{rk}(i)}$), in which HT.Update represents an assignment function, sk represents the random key, PRF represents the second pseudorandom function, $\pi$ represents a pseudorandom permutation from [1,n] to [1,n], and rk represents a pseudorandom permutation key.

14. The non-transitory computer-readable medium of claim 13, wherein:
the plurality of keys is represented by a key set:
$(k_1, \ldots, k_m)$, in which $k_1 \ldots k_m$ represent keys and m is the maximum index variable for the keys; and
the retrieving values is performed according to expressions:
For $i \in [1,m]$:
$v_{\pi_{rk}}$=HT.Find($PRF_{sk}(k_{\pi_{rk}(i)})$), in which HT.Find represents a retrieve function for the hash table and $\pi$ represents a pseudorandom permutation from [1,m] to [1,m].

15. The non-transitory computer-readable medium of claim 12, wherein the generating of the random key occurs only once.

16. The non-transitory computer-readable medium of claim 11, wherein:

the random key is generated for the keyed hash function; and the keyed hash function is based on a secure hash algorithm (SHA) that includes SHA-1, SHA-2, or SHA-3.

17. The non-transitory computer-readable medium of claim 11, wherein the operations further comprise storing the hash table in an encrypted memory.

18. The non-transitory computer-readable medium of claim 11, wherein the server enclave and the client enclave are part of a trusted execution environment.

19. The non-transitory computer-readable medium of claim 18, wherein the trusted execution environment includes software guard extensions (SGX).

20. The non-transitory computer-readable medium of claim 11, wherein only a distribution of query collisions are vulnerable to being revealed to an unauthorized entity.

* * * * *